Sept. 29, 1959 M. L. LESSER 2,907,009

MAGNETIC HEAD COMMUTATOR

Filed July 5, 1956 2 Sheets-Sheet 1

INVENTOR.
MURRAY L. LESSER
BY
John B. Aponaler
AGENT

Sept. 29, 1959 M. L. LESSER 2,907,009

MAGNETIC HEAD COMMUTATOR

Filed July 5, 1956

2 Sheets-Sheet 2

United States Patent Office 2,907,009
Patented Sept. 29, 1959

2,907,009

MAGNETIC HEAD COMMUTATOR

Murray L. Lesser, Palo Alto, Calif., assignor to International Business Machines Corporation, New York, N.Y., a corporation of New York Application July 5, 1956, Serial No. 596,073
8 Claims. (Cl. 340—174)

This invention relates to data storage systems and, more particularly, pertains to a magnetic recording system wherein more than a single transducer head is positioned to coact with a track or path of a recording medium as, for example, the lateral surface of a drum, the radial surface of a disc, or the surface of an endless tape which is continuously moving.

It is well established in magnetic recording to have a single transducer head coact with a magnetic track of a cyclically moving magnetic medium for recording data thereon or reading data therefrom. Arrangements have been shown also where more than one transducer head coacts with a specific track or path of such a medium so that access time for recording or reading data is reduced by having the head nearest the desired data to be read or recorded actuated for such functioning. For example, where more than one unit record is recorded upon a selected track, any one of the records can be read out via the transducer head which the desired record is then approaching, as the record medium moves.

In the present invention data is recorded along a track of a cyclically moving medium, the track as recording proceeds being subdivided into a plurality of recordings or records of equal length, there being as many transducer heads provided for coacting with the track as there are recordings or records. As the record medium moves, each of the transducer heads cooperates with the magnetic track or path to read or record each of the plurality of records in succession, and the head is switched in synchronism with the movement of each recording or record via a commutating arrangement so that, in effect, each of the plurality of records may be read out continuously from a selected circuit of the commutating arrangement. Recording is also accomplished in a similar manner so that a plurality of data groups may be entered simultaneously into the recording spaces into which the single track or path of the magnetic medium is divided as a result of the commutating process previously referred to. In other words, recording in the instant invention is in the nature of a parallel entry rather than by the conventional serial data entry normally used in magnetic recording.

It is therefore an object of this invention to provide a magnetic storage unit capable of storing a plurality of different records on a single path of a continuously moving magnetic medium, wherein the records may be recorded or read out simultaneously.

Another advantage of the invention is in the reduced speed of operation which is permitted with a structure in the nature of the invention since each record per se is scanned as many times per revolution of the recording medium as there are magnetic heads cooperating with the record path or track. A further object, therefore, is to provide a magnetic storage device wherein the moving recording medium may be operated at low speeds.

Frequently it is desirable in a magnetic recording machine to have more than one magnetic drum or disc device. Sometimes the drums or discs are of different diameters, and may be operated at different speeds. In the present invention, by arranging one of the recording sectors of a track to act as a clock track, each track of a disc or drum is provided with its own synchronizing or timing pulses. It is therefore a further object of this invention to provide a magnetic recording device wherein data bits and "clock" bits are recorded in the same magnetic path, the latter bits being continuously sensed for reading or recording the former bits.

Still another object of the invention is to provide a single recording path in a cyclical magnetic data storage unit wherein a plurality of different records may be recorded and from which selections of recorded data may be read out and recombined to be recorded simultaneously in other record positions of the same magnetic path.

Other objects of the invention will be pointed out in the following description and claims and illustrated in the accompanying drawings, which disclose, by way of example, the principle of the invention and the best mode which has been contemplated of applying that principle.

Figure 1:
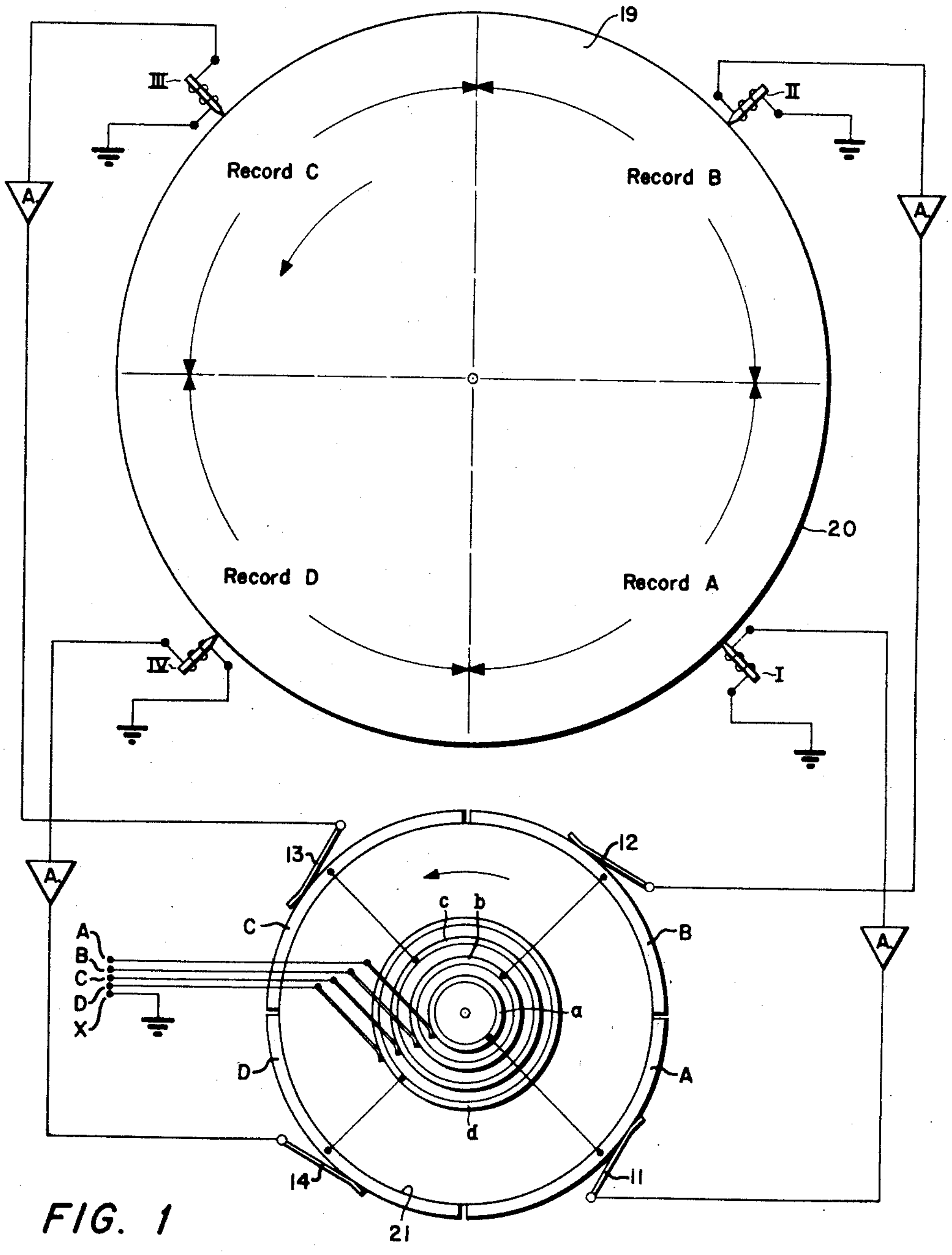
Fig. 1 is a diagrammatic view of a single magnetic track or path and the associated commutating arrangement for continuously reading out or recording upon any one of the different records comprising the path.

With reference to Fig. 1, there is shown a record path 20 corresponding to any one of a number of such paths provided by the lateral surface of a conventional magnetic recording drum 19. Equally spaced about the path 20 there are provided four transducers I, II, III, IV. Each of the transducers cooperates for recording or reproducing data on the path 20. The drum 19 normally rotates continuously in a counterclockwise direction, via a driving means (not shown) which also moves a commutating ring 21 in synchronism with the drum. The commutating ring is divided into four equal segments A, B, C, D. Equally spaced about and coacting to make contact with the commutating ring 21 are four brushes 11, 12, 13, 14, the spacing of the brushes corresponding in angular relationship precisely to the spacing of the aforementioned transducers I, II, III, IV. The segments A, B, C, D of the commutator ring are connected respectively to contact rings *a, b, c, d,* each of which has a sliding contact coacting therewith to make contact respectively to the terminals A, B, C, D.

Each of the transducers I, II, III, IV is connected electrically through an amplifier A to a corresponding brush of the commutator ring 21. For example, transducer I is connected to brush 11, transducer II is connected to brush 12, etc. The common side of each transducer is electrically connected to ground.

The device functions in the following manner. Assume that four different recordings have been placed upon the magnetic path 20 corresponding, respectively, to the sectors indicated by record A, record B, record C, and record D. As the drum 19 rotates together with the commutator ring 21, record A (as shown in Fig. 1) will be sensed by transducer I which is connected to brush 11 bearing on the commutator ring segment A. At this time contact with segment A is made through the contact ring *a* and its associated sliding contact to terminal A. Similarly, record B is sensed by transducer II which is connected to brush 12 contacting commutator segment B which is connected through contact ring *b* and its associated sliding contact to terminal B. It is obvious that record C via transducer III is similarly sensed to provide its output at terminal C and record D via transducer IV to provide its output at terminal D. As the drum 19 continues to rotate in the counterclockwise direction indicated, record A will finally be removed from transducer I, and at such time this record will be sensed by transducer II. Since the commutator ring 21 is turned in synchronism with the drum 19, when record A comes under transducer II the commutator segment A will make contact with brush 12 so that record A is now being sensed by transducer II which is connected to brush 12 and the output of record A is still derived through the contact ring *a* and its associated sliding contact to terminal A. As the record A continues farther in its cyclic path of travel, transducer II will be cleared. At this time record A will begin to be sensed by transducer III which is connected through its amplifier A to brush 13. Since at this time brush 13 is no longer making contact with commutator segment C but is now making contact with commutator segment A, the output of record A will still be derived from terminal A via contact ring *a*, commutator segment A and brush 13. As the record A continues to advance, transducer III will be cleared and transducer IV will begin to sense record A. By inspection of the arrangement of Fig. 1, it is obvious that at this time the data of record A will still be continued to be delivered to terminal A, as has been explained with respect to transducers I, II and III. It is equally obvious that the outputs of records B, C and D will be delivered to their respective terminals B, C and D as shown in the arrangement of Fig. 1.

Still referring to Fig 1, it is apparent that recording of data upon the magnetic path 20 of the drum 19 is effected in a manner similar to the reading out of data, in this instance the data input being through terminal A to record A, the data input to record B being through terminal B, etc.

Figure 2:
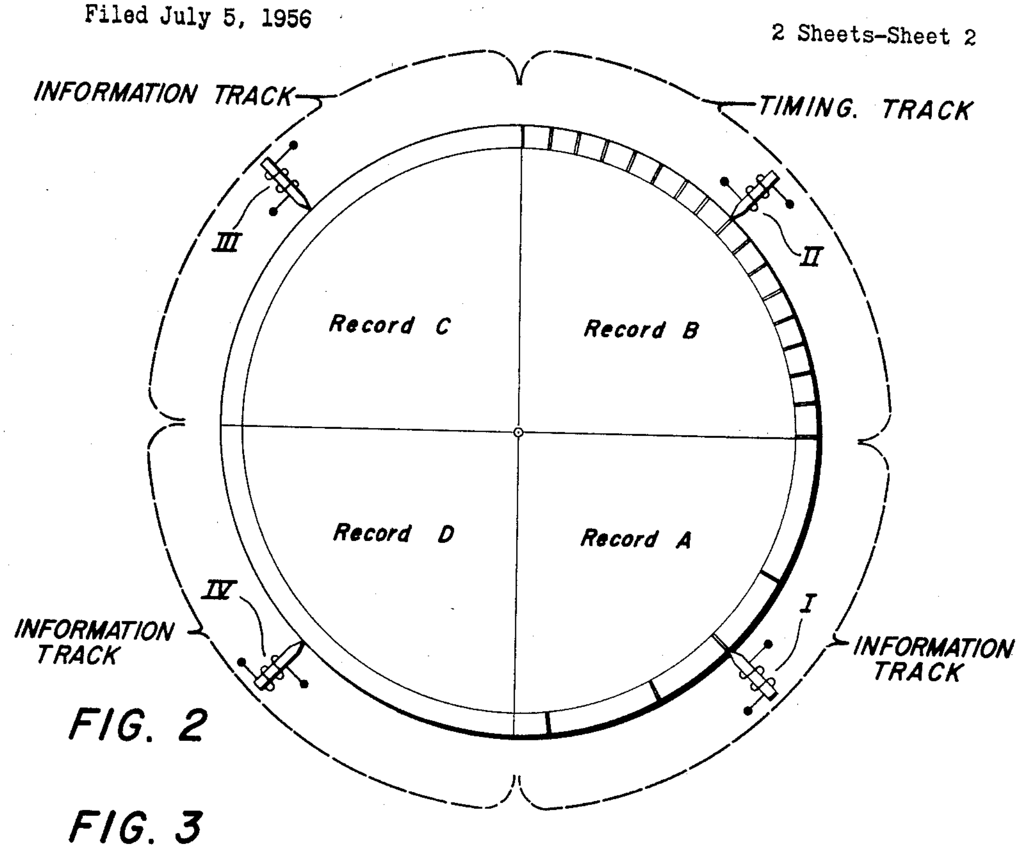
Fig. 2 is a diagrammatic illustration of a record path subdivided into different records, one of which records is a timing or synchronizing agency for the other records.

Since it is immaterial what is contained in the various records A, B, C and D as shown in Fig. 1, a modification of the embodiment shown in Fig. 1 may include a magnetically recorded timing track in one of the recording sectors, as, for example, in record B of Fig. 2. Here there are provided three sectors corresponding to information tracks where data may be stored and one sector where timing indicia (equally spaced magnetized bits, for example) are stored. It is readily understood that an arrangement of this kind can be adapted to the structure of Fig. 1 so that the output of the record B, that is, the clock track pulses, will always be derived from terminal B of Fig. 1 and the data output of records A, C and D will always be derived from terminals A, C and D, respectively, of the structure of Fig. 1. In this manner a unique type of storage path or track is provided for each track or path of a magnetic drum or disc, and it is possible in this manner to store information in different tracks of a drum using different bit densities in the various tracks. It is also possible, using an arrangement as in Fig. 2, to provide data outputs from different paths of two different magnetic drums of different diameters and rotating at different speeds (in this instance requiring a commutating arrangement for each drum) so that a very flexible arrangement is provided.

Figure 3:
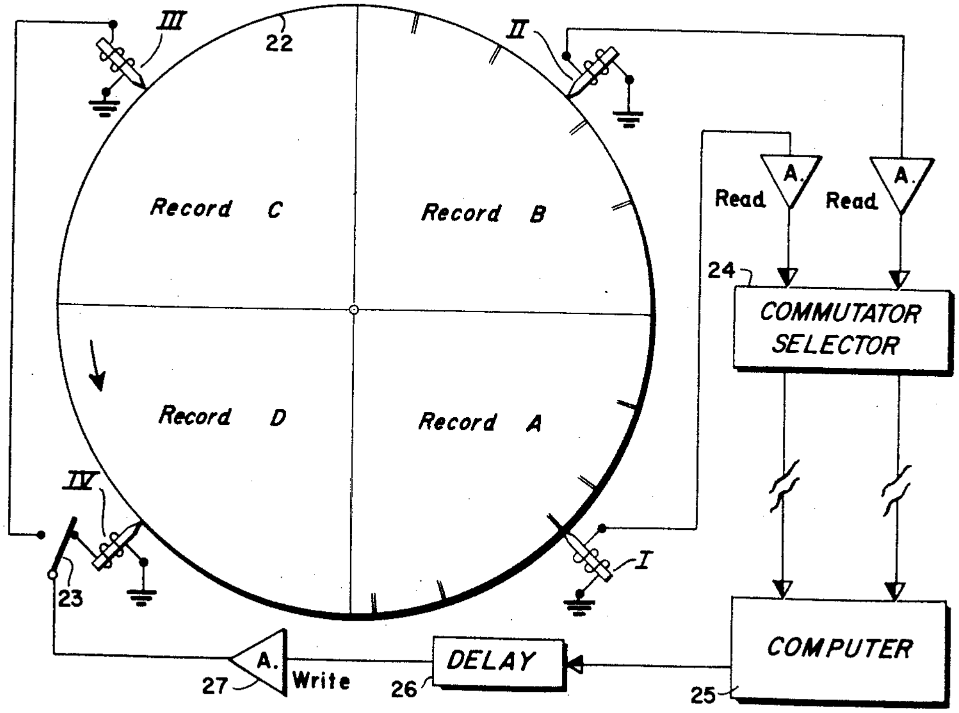
Fig. 3 shows a diagrammatic arrangement of the device illustrated in Fig. 1 wherein a plurality of different records in the same path of a cyclical recording medium may be selectively operated so that simultaneous reading and recording in different records may be carried out by a commutator selector.

Fig. 3 shows a further diagrammatic arrangement of the basic principle of the invention described in connection with Fig. 1. In this arrangement the continuous record path 22 is divided into four recording sectors similar to the records A, B, C, D of Fig. 1. Each sector in this instance may have recorded upon its path a different data group so that each of the record sectors can be sensed or recorded via the respective transducers I, II, III, IV. The transducers I and II in this instance are shown for reading out data and the transducers III and IV are shown for recording data under control of a switch 23. The outputs of the transducers I and II are delivered through amplifiers to a commutator selector 24. The outputs from the transducers I and II may be supplied to a computer 25 having an output to a delay line 26 and through a further amplifier 27 to the switch 23 which affords distribution to either transducer III or transducer IV. Using an arrangement of this kind and assuming that numerical information has been recorded in the sectors corresponding to record A and record B (Fig. 3), data can be selectively read out of either of these two records under control of the commutator selector 24 (which may be merely a commutator ring arrangement including selector switches, as shown in Fig. 1). The output of the computer 25 might be, for example, the addition of numerical data contained in the respective records A and B, and such an output is supplied through the delay 26 and the "write" amplifier 27 to either transducer III or transducer IV by means of the switch 23. Consequently, data from more than one recording sector of a magnetic path may be read out simultaneously and re-recorded in another sector of the same path by the arrangement shown in Fig. 3.

Various other arrangements of a similar nature to that shown in Fig. 3 may be obtained by modification of the arrangement of Fig. 1.

While there have been shown and described and pointed out the fundamental novel features of the invention as applied to the preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A storage device including a cyclical carrier, a plurality of transducers coacting with a path of said carrier to store or to remove from storage data thereon, said transducers being equally spaced along said path, a commutator synchronized with said carrier having connections to each said transducer for effecting a distribution of the storage capacity of said path into equal recording areas corresponding to the number of said transducers, and circuits from the said commutator whereby each said recording area is continuously available for recording or reproducing data.

2. A storage device including a cyclical carrier, a plurality of transducers coacting with a path of said carrier to store or to remove from storage data thereon, said transducers being equally spaced along said path, a commutator synchronized with said carrier having connections to each said transducer for effecting a division of all the data of said path into records of equal length corresponding to the number of said transducers, and circuits from the said commutator whereby each said record is continuously reproduced.

3. A magnetic storage device including a cyclical carrier, a plurality of transducers for recording or reproducing data upon a path of said carrier equally spaced along said path, and a commutator associated with said transducers for dividing the said path into a plurality of record areas equal to the number of transducers and for commutating the output of each said transducer whereby the data of each record area is read out continuously.

4. A magnetic storage device including a cyclical carrier, a plurality of transducers for recording or reproducing data upon a path of said carrier equally spaced along said path, and a commutator assocated with said transducers for dividing the said path into a plurality of record areas equal to the number of transducers and for commutating the output of each said transducer whereby the data of each record area is read out simultaneously.

5. The invention according to Claim 4 with the further provisions of timing pulse representations recorded in one of the said record areas.

6. A storage device including a cyclical carrier, a plurality of transducers equally spaced along a path of said carrier for reproducing data representations thereon, and means for dividing the said path into recording areas of equal length, the number of said areas equaling the number of transducers, and for commutating the said areas with the said transducers whereby the data of each said area is continuously reproduced.

7. A data storage device including a cyclical carrier having a plurality of transducers arranged in regular intervals around a closed path thereof for coacting to record or reproduce data thereon, and means for dividing the effective length of said path into equal increments according to the number of said transducers and for switching said transducers to effect a rotation of their coaction with said path in accordance with the movement of said carrier whereby the data recorded or reproduced relating to each said increment is continuous.

8. A storage device including a cyclic carrier, recording means having a plurality of transducers equally spaced along a path of said carrier to divide said path into recording areas of equal length, a corresponding plurality of simultaneously operable data lines each of which is associated with a different said area, and a commutator having connections between said data lines and said transducers and adapted for synchronous operation with said carrier to maintain each said line in continuous data transferring association with its associated said area to allow data transfer operations involving said areas to be performed simultaneously.

References Cited in the file of this patent

UNITED STATES PATENTS

| | | |
|---|---|---|
| 2,519,725 | White | Aug. 22, 1950 |
| 2,539,556 | Steinberg | Jan. 30, 1951 |
| 2,680,239 | Daniels et al. | June 1, 1954 |